United States Patent [19]

Sano

[11] Patent Number: 5,685,002
[45] Date of Patent: Nov. 4, 1997

[54] IMAGE PROCESSING SYSTEM CAPABLE OF GENERATING A MULTI-PICTURE IMAGE

[75] Inventor: Homare Sano, Sagamihara, Japan

[73] Assignee: Minolta Co., Ltd., Osaka, Japan

[21] Appl. No.: 312,069

[22] Filed: Sep. 26, 1994

[30] Foreign Application Priority Data

Sep. 29, 1993 [JP] Japan ................... 5-243056

[51] Int. Cl.$^6$ .................... G06F 17/00; H04N 1/387
[52] U.S. Cl. .................... 395/779; 395/117; 358/450
[58] Field of Search .................... 358/450, 451, 358/448; 382/293, 295, 296, 297, 298, 299, 284; 395/117, 782, 779

[56] References Cited

U.S. PATENT DOCUMENTS

| | | | |
|---|---|---|---|
| 4,636,872 | 1/1987 | Prichard | 395/117 |
| 4,672,462 | 6/1987 | Yamada | 358/450 |
| 4,710,821 | 12/1987 | Ohta | 382/299 |
| 4,933,773 | 6/1990 | Shiota et al. | |
| 4,991,004 | 2/1991 | Hayashi et al. | |
| 5,184,227 | 2/1993 | Foley | |
| 5,231,516 | 7/1993 | Kamon et al. | 358/450 |

FOREIGN PATENT DOCUMENTS 3-274047  12/1991  Japan.

*Primary Examiner*—Scott A. Rogers
*Attorney, Agent, or Firm*—Burns, Doane, Swecker & Mathis, LLP

[57] ABSTRACT

An image processing system generates a multi-picture image in which a plurality of pictures are arranged in a single frame, and includes an original picture generator such as image reader or film image scanner, a format determinator to determine a suitable visualization format for the plurality of pictures and a multi-picture image generator to generate a multi-picture image in accordance with the determined visualization format. The determinator includes a detector to detect the number of the pictures and determines a suitable format based on the number of the pictures.

21 Claims, 22 Drawing Sheets

FIG. 13

| DATE | MEMO : | | |
|---|---|---|---|
| G→ Y X 1 | 2 | 3 | 4 |
| 5 | 6 | 7 | 8 |
| 9 | 10 | 11 | 12 |
| 13 | 14 | 15 | 16 |
| 17 | 18 | 19 | 20 |

FIG. 14

| DATE | MEMO : | | | |
|---|---|---|---|---|
| 1 | 2 | 3 | 4 | 5 |
| 6 | 7 | 8 | 9 | 10 |
| 11 | 12 | 13 | 14 | 15 |
| 16 | 17 | 18 | 19 | 20 |
| 21 | 22 | 23 | 24 | 25 |
| 26 | 27 | 28 | | |

FIG. 15

| | MEMO : | | | | |
|---|---|---|---|---|---|
| DADE | | | | | |
| G~ Y X 1 | 2 | 3 | 4 | 5 | 6 |
| 7 | 8 | 9 | 10 | 11 | 12 |
| 13 | 14 | 15 | 16 | 17 | 18 |
| 19 | 20 | 21 | 22 | 23 | 24 |
| 25 | 26 | 27 | 28 | 29 | 30 |
| 31 | 32 | | | | |

FIG. 16

| | MEMO : | | | | | |
|---|---|---|---|---|---|---|
| DATE | | | | | | |
| Y X 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 32 | 33 | 34 | 35 |
| 36 | 37 | 38 | 39 | 40 | | |

FIG. 17

| | | | | | | | |
|---|---|---|---|---|---|---|---|
| DATE | MEMO : | | | | | | |
| Y X 1 (G) | 2 | 3 | 4 | 5 | 6 | 7 | 8 |
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | | |
| 47 | 48 | 49 | 50 | 51 | 52 | | |

FIG. 18A

| DATE | MEMO: | | 1/2 |
|---|---|---|---|
| 1 | 2 | 3 | 4 |
| 5 | 6 | 7 | 8 |
| 9 | 10 | 11 | 12 |
| 13 | 14 | 15 | 16 |
| 17 | 18 | 19 | 20 |

FIG. 18B

| DATE | MEMO: | | 2/2 |
|---|---|---|---|
| 1 | 2 | 3 | 4 |
| 5 | 6 | 7 | 8 |
| 9 | 10 | 11 | 12 |
| 13 | 14 | 15 | 16 |
| 17 | 18 | 19 | 20 |

IMAGE PROCESSING SYSTEM CAPABLE OF GENERATING A MULTI-PICTURE IMAGE

BACKGROUND OF THE INVENTION

This invention relates to an image processing system capable of arranging a plurality of pictures in a single frame and, particularly to an image processing system capable of automatically setting a layout pattern according to the number of pictures to be arranged in a single frame.

So-called album printers have been proposed which can print a single printing sheet a plurality of photographed pictures on a film, thereby automatically making a leaf of an album, as shown in Japanese Unexamined Patent Publication No. 3-274047. Such an album printer has a plurality of already stored layout patterns; reads frame information concerning whether each picture on the film is vertically framed or horizontally framed and determines a layout pattern for each printing sheet based on the frame information. This printer further generates an image data to be printed on a single printing sheet from the read pictures based on the determined layout pattern, and prints the thus generated image data on the printing sheet.

In the case where several tens of pictures constitute a group of pictures relating to the same theme, it is useful to visualize photographed pictures belonging to the same theme together with character information such as title and comment, for example, by printing them on a single printing sheet, or displaying them on a CRT (Cathode Ray Tube) display device. Such visualized image can be used as index information in searching and arranging the picture groups, and comparing with pictures.

With the aforementioned album printer, the print size of pictures is fixed and the size of printing sheet is also fixed. Accordingly, the number of pictures to be printed on one printing sheet is limited to three or four. Further, the number of pictures to be printed on one printing sheet may differ depending upon whether the pictures are vertically or horizontally framed, resulting in nonuniform layouts and blank areas of different sizes. This is not preferable in terms of appearance.

It is difficult with the printing art of the above album printer to arrange and print several tens of pictures on a single printing sheet in a well-balanced and organized fashion.

SUMMARY OF THE INVENTION

It is an object of the present invention to provide an image processing system which has overcome the problems residing in the prior art.

It is another object of the present invention to provide an image processing system which can automatically set a suitable visualization format according to the number of pictures and visualize a plurality of pictures in a single frame in a predetermined visualization format.

Accordingly, the present invention is directed to an image processing system comprising: an original picture generator operable to generate a plurality of pictures; a format determinator operable to determine a suitable visualization format for the plurality of pictures; and a multipicture image generator operable to generate a multi-picture image in which the plurally of pictures are arranged in a single frame in accordance with the determined visualization format.

The format determinator may be provided with: a detector operable to detect the number of the pictures; a memory storing a plurality of visualization formats corresponding to the number of the pictures; and a selector operable to select a suitable format among the plurality of formats stored on the memory based on a detected number of the pictures.

It may be appreciated that the plurality of visualization formats includes: a first format in the form of a square matrix which has the same number of lines and columns; and a second format in the form of a non-square matrix which has a different number of lines and columns. A suitable format may be selected based on a square root of the number of the pictures. The plurality of visualization formats may be stored on a ROM memory.

The format determinator may be provided with a detector operable to detect the number of the pictures; a calculator operable to calculate a square root of the detected number; and a matrix determinator operable to determine, based on the calculated square root, the number of columns and lines of a matrix format suitable for the plurality of pictures.

The original picture generator may be provided with an image reader operable to read the plurality of pictures recorded on a film. The image reader may be constructed by: a film feeder operable to feed the film; an image scanner operable to scan a picture located at a specified position; a controller operable to control the film feeder and the image scanner to feed a desired picture of the plurality of pictures to the specified position and scan the desired picture at the specified position.

The format determinator may be provided with a magnetic detector operable to read magnetic frame information on the film to detect the number of the pictures, or alternatively provided with a magnetic detector operable to read film information recorded on the film to detect the number of the pictures. Further, the format determinator may detect the number of the pictures to determine a suitable format before the film scanner scans the pictures.

The original picture generator may be provided with an image reader operable to read the plurality of images.

The image processing system may be provided with a printer operable to print the multi-picture image on a printing sheet, a cathode ray tube type display device to display the multi-picture image, or facsimile machine operable to transmit the multi-picture image.

Also, the present invention is directed to a method for generating a multi-picture image in which a plurality of pictures are arranged in a single frame, the method comprising: reading a plurality of pictures; calculating the number of the pictures; determining a suitable visualization format for the calculated number; and combining the plurality of pictures in accordance with the determined visualization format to generate a multi-picture image.

Further, the present invention is directed to a method for generating a multi-picture image in which a plurality of pictures are arranged in a single frame, the method comprising: detecting the number of pictures stored on a recording medium; determining a suitable visualization format for the detected number: reading the pictures in accordance with the determined visualization format; and combining the read pictures to generate a multi-picture image.

The generated multi-picture image may be printed on printing paper.

With thus constructed image processing system, the format determinator calculates the number of the plurality of pictures and selects a visualization format suitable for the calculated number. The multi-picture image generator combines the plurality of pictures in a single frame in accordance with the determined visualization format.

Accordingly, a group of pictures, for example, relating to the same theme is quickly arranged and visualized in the single frame in a well-balanced manner. In this way, the multi-picture image which will be useful as an index information, filing material and material for a presentation can be easily made. Also, the multi-picture image data can be sent to a printer, CRT/LCD display, or facsimile machine, to visualize the multi-picture image on a printing sheet or CRT/LCD display device, or transmit to a remote location by facsimile machine.

These and other objects, features and advantages of the present invention will become more apparent upon a reading of the following detailed description and accompanying drawings.

BRIEF DESCRIPTION OF THE DRAWINGS

FIG. 13 is a diagram showing that twenty pictures are reproduced in a single frame in a (5, 4) matrix layout pattern;

FIG. 14 is a diagram showing that twenty eight pictures are reproduced in a single frame in a (8, 5) matrix layout pattern;

FIG. 15 is a diagram showing that thirty two pictures are reproduced in a single frame in a (6, 6) matrix layout pattern;

FIG. 18 is a diagram showing that forty pictures are reproduced in a single frame in a (6, 7) matrix layout pattern;

FIG. 17 is a diagram showing that fifty two pictures are reproduced in a single frame in a (7, 8) matrix layout pattern;

FIGS. 18A and 18B are diagrams showing that forty pictures are reproduced in two frames in a (5, 4) matrix layout pattern, FIG. 18A showing the first frame and FIG. 18B the second frame;

DETAILED DESCRIPTION OF THE PREFERRED EMBODIMENTS OF THE INVENTION

Figure 1:
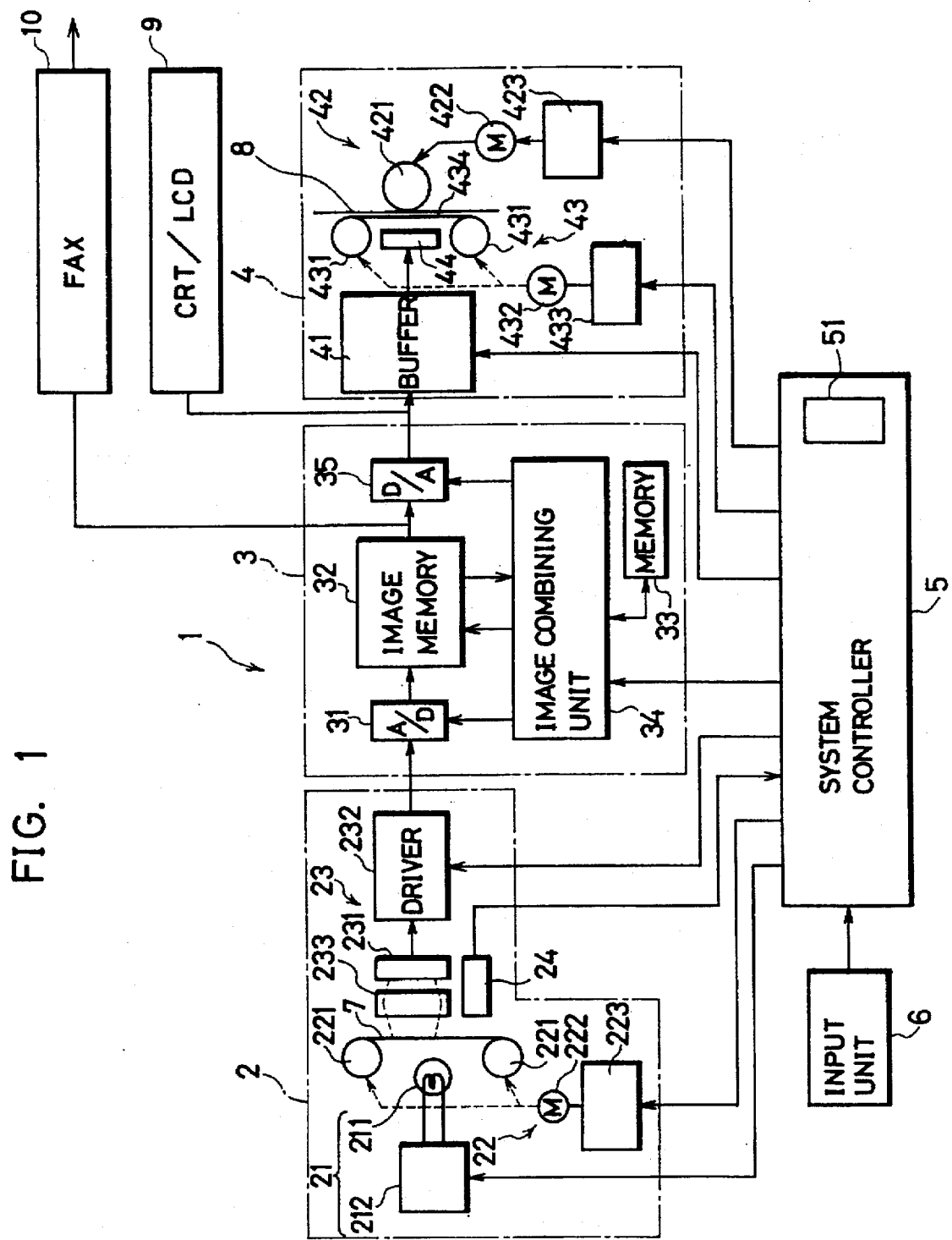
FIG. 1 is a schematic construction diagram showing a first image processing system according to the invention.
Figure 2:
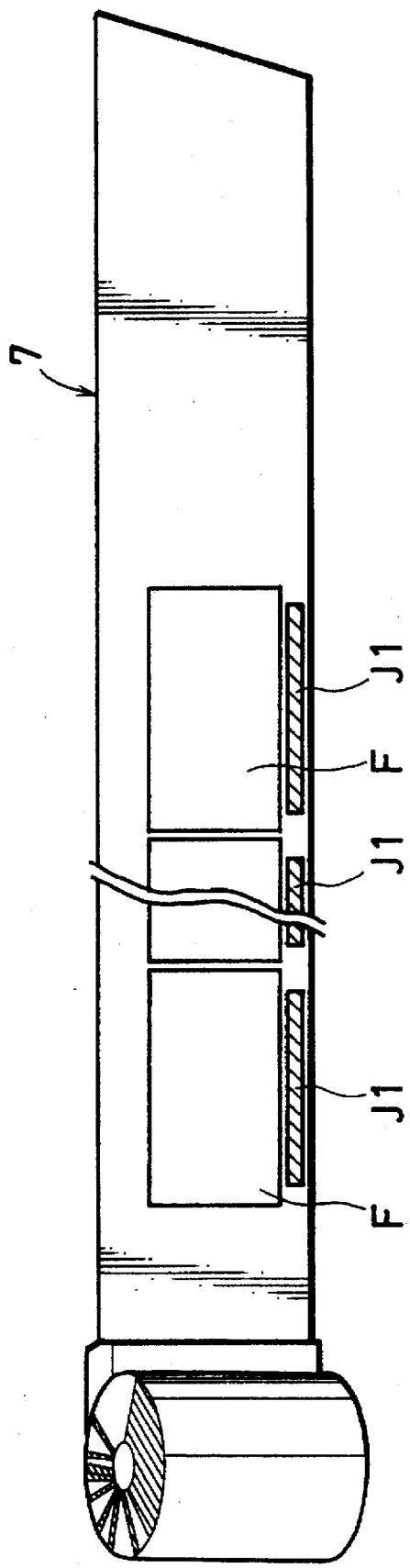
FIG. 2 is a perspective view showing a film provided with magnetic recording portions.
Figure 3:
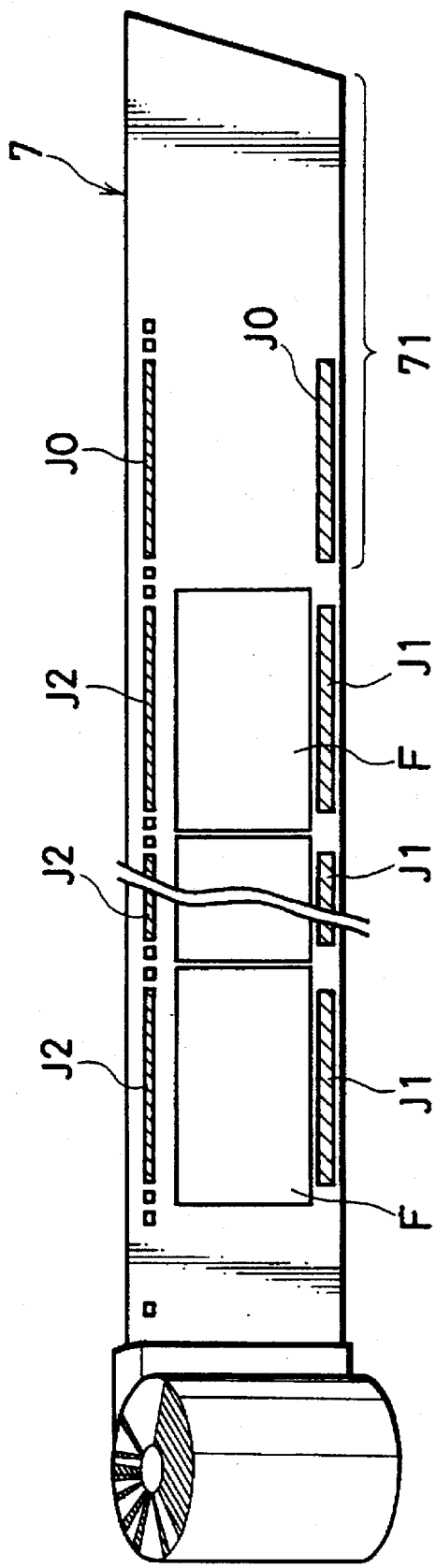
FIG. 3 is a perspective view showing another film provided with magnetic recording portions.

FIG. 1 is a schematic construction diagram showing an image processing system 1 according to the invention. In the shown image processing system 1, a plurality of pictures recorded on a film 7 are read, and processed into a multi-picture image data in which the plurality of pictures are arranged in a predetermined pattern. The multi-picture image data is visualized on a single printing sheet by a printer 4, a display screen of a CRT/LCD display device 9, or transmitted to a remote positioned display or recording device by a facsimile machine 10, for example.

The following description of the image processing system will be made mostly in connection with the visualization of multi-picture image data by the means of printer 4. However, the multi-picture image data may be visualized on the CRT/LCD display device 9, or facsimile machine 10 in the conventional ways.

The image processing system 1 is provided with a film scanner 2, an image processor 3, the printer 4, a system controller 5, and an input unit 6. The film scanner 2 automatically reads pictures. The image processor 3 applies a specified image processing to the read pictures, stores them in an image memory 32, and generates from the picture image data stored in the image memory 32 image data to be visualized, that is, multi-picture image data. The printer 4 prints the multi-picture image data generated by the image processor 3 on the printing sheet 8. The system controller 5 centrally controls the film scanner 2, image processor 3, and printer 4. The input unit 6 is adapted for inputting a variety of kinds of information including the size of multi-picture image frame, e.g., printing sheet size, printing direction, the number of multi-picture image frames, the kind of film 7 and a variety of commands, such as start of printing operation.

The film scanner 2 includes a light source 21, a film feeder 22, an image reader 23, and a frame number detector 24. The light source illuminates the film 7 in the form of a roll film or film strips obtained by dividing the roll film so that pictures are projected on a sensing surface of the image reader 23. The film feeder 22 automatically feeds the film 7 so that pictures are placed one after another at a specified reading position. The image reader 23 reads pictures of the film 7. The frame number detector 24 detects the number of picture frames recorded on the film 7.

The light source 21 includes a lamp 211 and an emission control circuit 212 for controlling the amount of light emitted from the lamp 211, and illuminates the film 7 with a given amount of light in accordance with a control signal from the system controller 5. The film feeder 22 includes a feed roller 221, a drive motor 222 for driving the feed roller 221 and a control circuit 223 for controlling the driving of the motor 222. When the pictures are read, the film feeder 22 feeds the film 7 so that the pictures are placed at the reading position one frame after another in accordance with a control signal from the system controller 5.

The image reader 23 includes a solid-state image pick-up device 231 including, for example, a CCD (Charge Coupled Device) for reading the picture set at the reading position, a CCD driver 232 for controlling the driving of the CCD 231, and an optical system 233 for projecting the picture at the reading position onto a sensing surface of the CCD 231. The image reader 23 reads each picture while photoelectrically converting the same into an electrical signal and outputs the read image signal to the image processor 3.

The CCD 231 may be a monochromatic image pick-up device, but may preferably be a color image pick-up device provided with color filters of red (R), green (G) and blue (B). Alternatively, optical filters of R, G and B and a filter drive circuit for driving these optical filters may be provided between the monochromatic CCD and the film. In this case, the pictures are picked up while being separated into three color images of R, G and B. The driving of the CCD driver 232 and optical system 233 is controlled by the system controller 5.

The frame number detector 24 includes a DX code sensor for reading a DX code which is optically recorded for each frame at a non-photographic area near perforations of the film 7, and a density sensor for detecting the density of the photographic area. The frame number detector 24 detects the number of all frames of the film 7 based on the read DX codes, and detects the number of unphotographed frames by judging on the basis of the detected density whether the instant frame has an actually photographed picture. The frame number detector 24 calculates the number of pictures by subtracting the unphotographed frame number from the all frame number, and sends the calculated picture number to the system controller 5.

Figure 4:
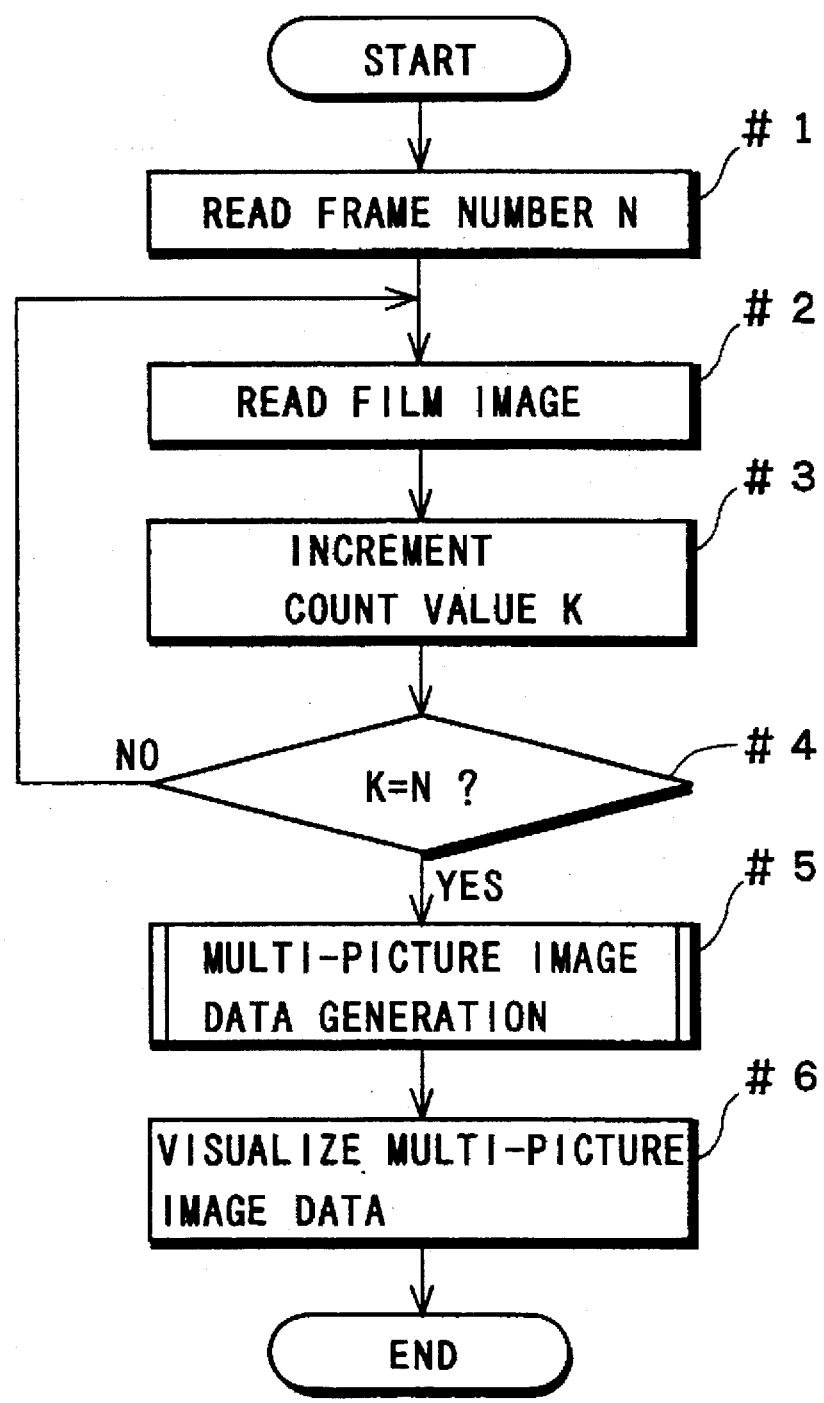
FIG. 4 is a flow chart showing an image processing operation routine of the first system.
Figure 5:
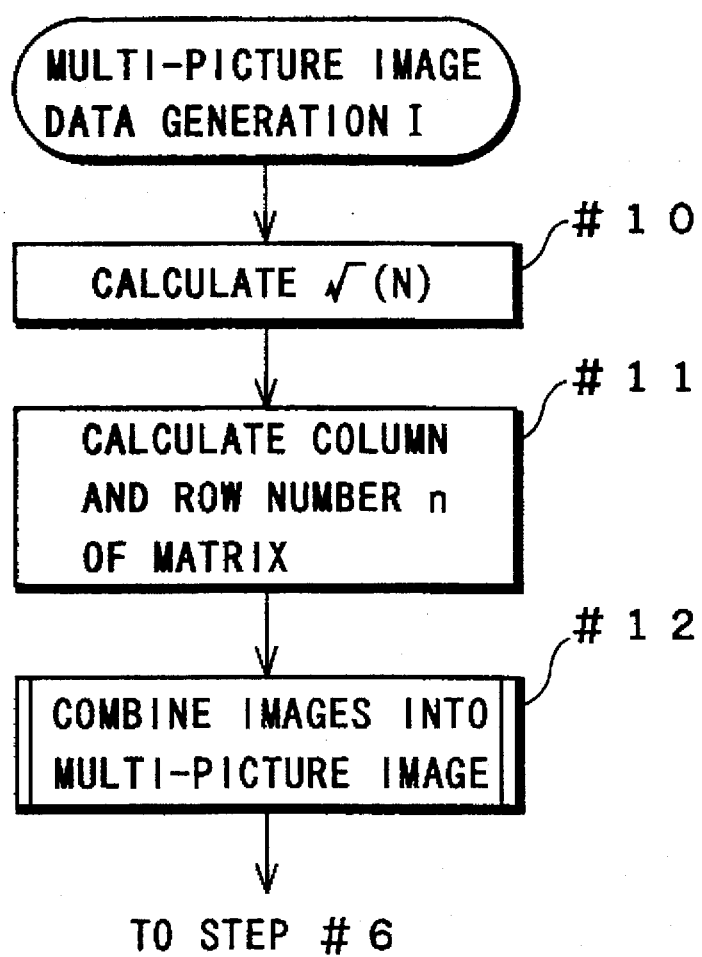
FIG. 5 is a flow chart showing a first "Multi-Picture Image Data Generation" subroutine of the image processing routine.

Recently, as shown in FIG. 4, there have been marketed films 7 provided with a magnetic recording portion J1 along one side thereof. The magnetic recording portion J1 is adapted for storing information for each frame, such as photography data, photographic conditions (e.g., exposure, photographic magnification). Also, as shown in FIG. 5, there have been marketed films 7 provided with a magnetic recording portion J0 in a leading portion 71 thereof and magnetic recording portions J1 and J2 along both sides thereof. The magnetic recording portion J0 is adapted for storing general information for the film 7, such as the number of pictures, title, photography location. The magnetic recording portions J1 and J2 are adapted for storing information for each frame.

Accordingly, to read pictures on the film 7 provided with the magnetic recording portion J0, J1 or J2, it may be appreciated to use a magnetic reader for reading the information recorded on the magnetic recording portion J0, 31 or J2 in place of or in addition to the frame number detector 24 to detect the number of pictures.

The image processor 3 reads pictures and generates multi-picture image data in accordance with the control signal from the system controller 5. The image processor 3 includes an analog-to-digital (A/D) converter 31, the image memory 32, a memory 33, an image combining unit 34, and a digital-to-analog (D/A) converter 35.

The A/D converter 31 converts an analog picture signal input from the film scanner 2 into a digital image signal. The image memory 32 includes a RAM (Random Access Memory) which has a first storage portion for storing picture image data which converted into the digital signals by the A/D converter 31 and a second storage portion for storing multi-picture image data. The memory 33 includes a ROM (Read Only Memory) in which character images are pre-stored.

The image combining unit 34 has a memory for storing picture image data to be combined. The image combining unit 34 converts character information, such as title, input from the input unit 6 into a character image in accordance with a control signal from the system controller 5. The character image is stored in the second storage portion of the image memory 32. Also, the image combining unit 34 reads out the picture image data from the first storage portion of the image memory 32 in a specified order, and processes the picture image data so that the picture expands or contracts in accordance with a specified visualization format, and records the processed picture image data in the second storage portion of the image memory 32 one after another. Consequently, a multi-picture image data is generated. The generation of visualization format and multi-picture image data will be described in more detail later.

The D/A converter 35 converts the digital multi-picture image data generated by the image combining unit 34 into an analog data and outputs the same to the printer 4 or CRT/LCD display device 9.

The printer 4 includes a buffer 41 for temporarily storing the multi-picture image data, a sheet feeder 42 for feeding the printing sheet 8, a ribbon feeder 43 for feeding an ink ribbon 434, and a printer head 44 of thermal transfer type. The printer 4 forms an image based on the multi-picture image data output from the image processor 3 on the printing sheet 8 which is a paper sheet or OHP sheet in accordance with the control signal from the system controller 5.

The printer head 44 is in the form of a dot matrix printing head having one or several lines, and produces an image in unit of one or several lines. The feeder 42 includes a feed drum 42 for feeding the printing sheet 8, a drum motor 422 for driving the feed drum 421 to rotate, and a motor control circuit 423 for controlling the driving of the drum motor 422.

The multi-picture image data generated by the image processor 3 is output to the printer 4 in unit of one line or several lines. This multi-picture image data is temporarily stored in the buffer 41. In the printer 4: the multi-picture image data is read from the buffer 41; the printing sheet 8 in the form of roll sheet or cut sheet mounted on the feed drum 421 is fed in synchronism with the reading of this multi-picture image data; and the printer head 44 is driven to press the ink ribbon 434 against the printing sheet 8, thereby forming an image represented by the multi-picture image data on the printing sheet 8 by means of thermal transfer. By alternately repeating the image generation in unit of one line or several lines and the feed of the printing sheet 8, the complete multi-picture image data is printed on the single printing sheet 8.

The system controller 5 is provided with a memory 51 including a ROM or the like. In the memory 51 is stored a program including a routine of generating multi-picture image data corresponding to the respective visualization formats.

The printing operation of the image processing system will be described with reference to flow charts shown in FIGS. 4 to 9.

FIG. 4 shows a principal operation of the image processing system shown in FIG. 1. This flow chart shows a control executed for reading all the pictures recorded on a roll film, generating a multi-picture image data in a visualization format corresponding to the number of pictures, and visualizing the generated multi-picture image data, for example, on a printing sheet. In this image processing, character information, such as title and comments for the pictures, is input by means of the input unit 6.

When the roll film is loaded in the film feeder 22 and a start signal is input from the input unit 6, the frame number detector 24 detects the frame number N of pictures recorded on the roll film 7 (Step #1). Subsequently, the pictures recorded on the roll film 7, i.e., actually photographed pictures, are read one after another (Steps #2 to #4). More specifically, the system controller 5 increments the count value K for frame number counter, for example, each time one picture is read from the image reader 23 (Step #3), and judges whether the count value K is equal to the frame number N. The pictures recorded on the roll film 7 are read until the count value K becomes equal to the frame number N.

It may be also appropriate to initially set the frame number N in the frame number counter when the frame number N is read, to decrement the count value K each time the picture is read, and to read the picture image data until the count value becomes 0.

When all the pictures of the roll film 7 are read (YES in Step #4), a visualization format corresponding to the frame number N is set and a multi-picture image data is generated in accordance with this visualization format (Step #5). The visualization format is a layout format in accordance with which the pictures are arranged in a single frame in a well-balanced manner using the frame number N as index information. In Step #6, subsequently, the multi-picture image data is visualized, for example, on the printing sheet 8.

FIG. 5 is a flow chart showing a first "Multi-Picture Image Data Generation" subroutine of the image processing routine shown in FIG. 4.

In this subroutine, a multi-picture image data is generated from N pictures in accordance with a visualization format for arranging the pictures in a square matrix (n, n). When this subroutine is called in Step #5, a square root $\sqrt{(N)}$ of the frame number (N) is calculated (Step #10). The number n of columns or rows of the matrix (n, n) is calculated based on $\sqrt{(N)}$ (Step #11). If $\sqrt{(N)}$ is an integer p having no fraction, this integer p is used as the number n. On the contrary, if $\sqrt{(N)}$ has a fraction, $\sqrt{(N)}$ is rounded up and an integer (p+1) is used as the number n. For example, if N=25, n=5 because $\sqrt{(25)}=5.0$. If N=28, n=6 because $\sqrt{(28)}=5.29$.

In Step #12, subsequently, a visualization format corresponding to the calculated layout pattern of (n, n) matrix is set. The character information is converted into the character image in accordance with the visualization format, and the image data representing the pictures are read sequentially from the image memory 32. These data are combined into a multi-picture image data. More specifically, when the number n is set, the system controller 5 calls a multi-picture image data generating procedure stored in the ROM 51 in correspondence with the visualization format of the number n and combines the character information and picture image data in accordance with this procedure to generate a multi-picture image data.

The generated multi-picture image data is output to the printer 4, CRT/LCD display device 9, or facsimile machine 10 to visualize the multi-picture image (Step #6). In the printer 4, as an example, the multi-picture image data is sent to the printer 4 one line after another or sequentially in unit of several lines to be printed on the printing sheet 8. Consequently, the image processing operation is completed when all the multi-picture image data are visualized.

Figure 6:
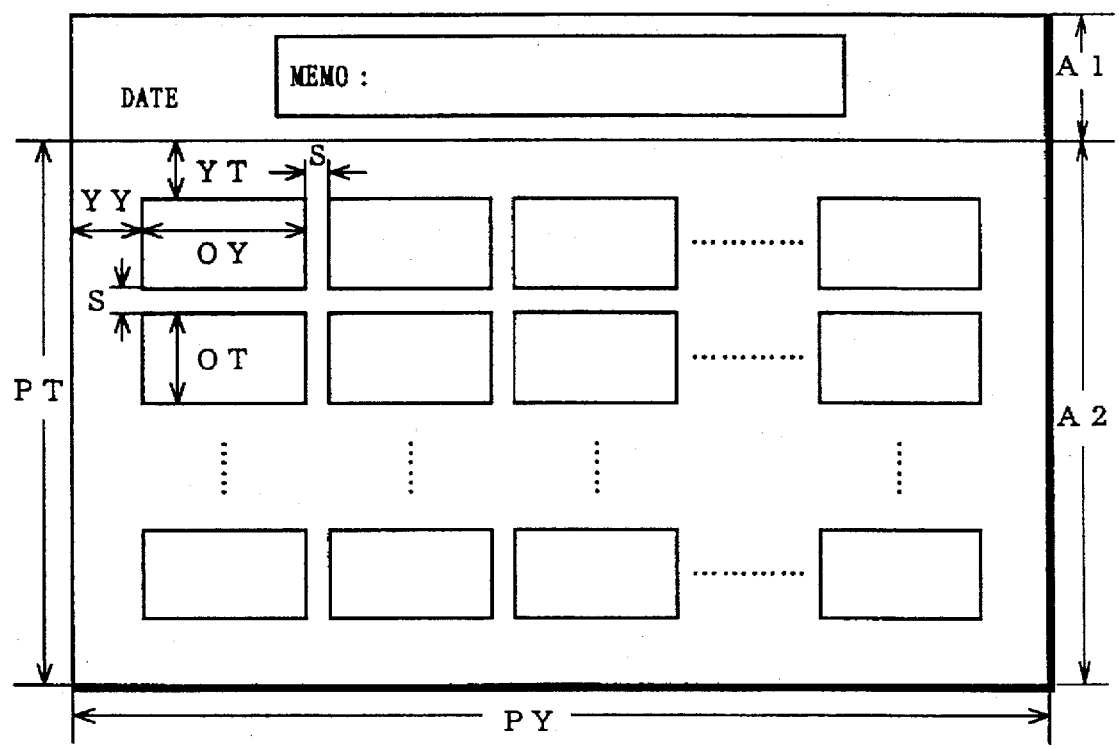
FIG. 6 is a diagram showing an exemplary multi-picture image produced in the image processing.

FIG. 6 shows an example of the generated multi-picture image. This multi-picture image has an arrangement whose line number is n and whose column number is m, and is visualized in a horizontally long frame. The multi-picture image has a memo area A1 where character information such as title and comments is to be written at a top thereof, and a picture area A2 below the memo area A2 where a plurality of pictures are to be arranged.

Figure 7:
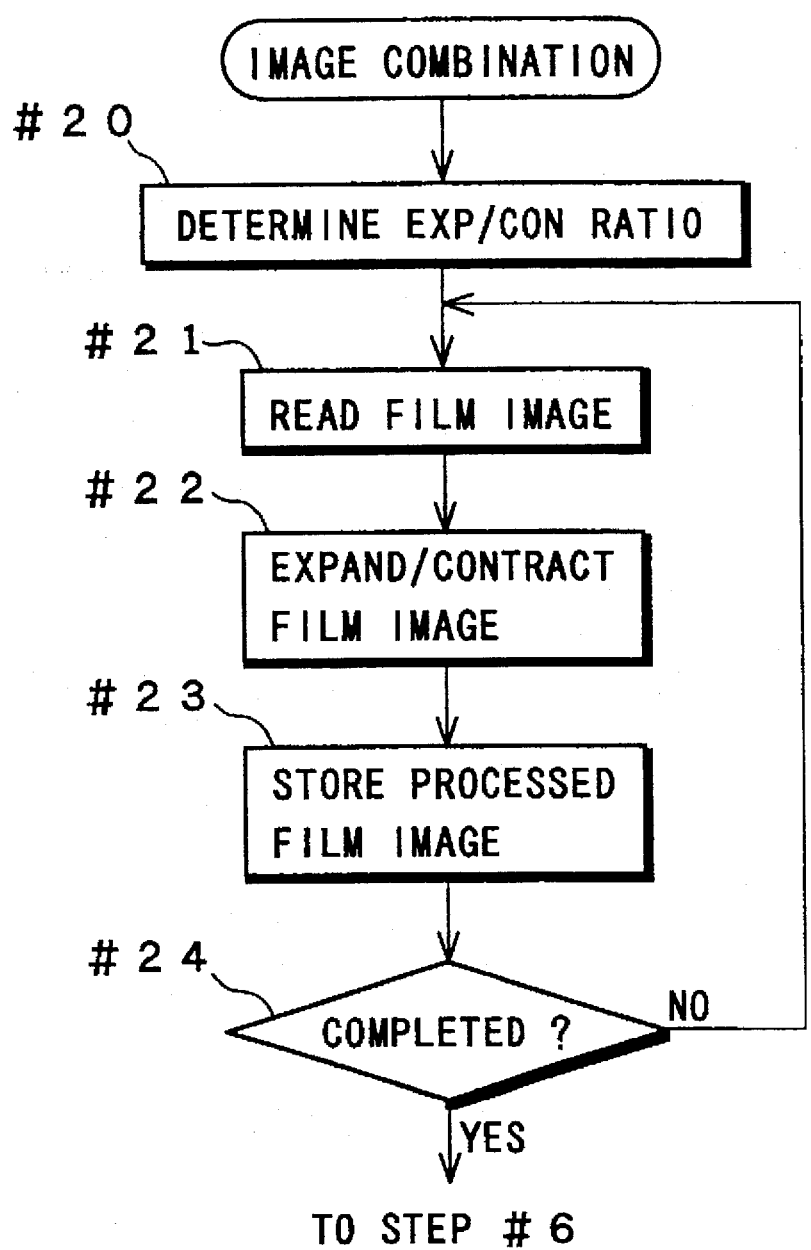
FIG. 7 is a flow chart showing an image combining operation of the first "Multi-Picture Image Data Generation" subroutine.

FIG. 7 is a flow chart showing a combination operation of pictures which is executed in Step #12 of the "Multi-Picture Image Data Generation" subroutine of FIG. 5.

In this embodiment, horizontal margins having a necessary minimum width of YT (mm) and vertical margins having a necessary minimum width of YY (mm) are provided in the picture area A2. The pictures are arranged within the horizontal and vertical margins. It should be that the width of the horizontal and vertical margins changes as the arrangement pattern changes.

After the character data is stored in a specified area of the second storage portion of the image memory 32, processed picture image data are stored in a specified area of the second storage portion of the image memory 32.

Specifically, an expanding/contracting ratio is determined in accordance with the visualization format (Step #20). For example, it is assumed, as shown in FIG. 6, that the picture area A2 has a vertical length of PT (mm) and a horizontal length of PY (mm); each picture has a vertical length of OT (mm) and a horizontal length of OY (mm); the pictures are spaced in vertical and horizontal directions from one another at a gap S; and the number of horizontally arranged pictures is m and the number of vertically arranged pictures is n. The following equation can be expressed.

$$PT = n \cdot OT + \{2 \cdot YT + S \cdot (n-1)\}$$

$$PY = n \cdot OY + \{2 \cdot YY + S \cdot (m-1)\}$$

Thus, the vertical and horizontal lengths OT and OY of each picture will be as follows.

$$OT = [PT - \{2 \cdot YT + S \cdot (n-1)\}]/n \quad (1)$$

$$OY = [PY - \{2 \cdot YY + S \cdot (m-1)\}]/m \quad (2)$$

Assuming that the picture has an original vertical length IT (mm) and an original horizontal length IY (mm), the vertical expanding/contracting ratio KT and the horizontal expanding/contracting ratio KY can be expressed as follows.

$$\begin{aligned} KT &= OT/IT \\ &= [PT - \{2 \cdot YT + S \cdot (n-1)\}]/(n \cdot IT) \end{aligned} \quad (3)$$

$$\begin{aligned} KY &= OY/IY \\ &= [PY - \{2 \cdot YY + S \cdot (m-1)\}]/(m \cdot IY) \end{aligned} \quad (4)$$

In the subroutine of FIG. 5, the pictures are arranged in the (n, n) matrix. Accordingly, the expanding/contracting ratios KT and KY are calculated in accordance with the equations (3) and (4) on the condition of n=m. The calculated ratios KT and KY are compared with each other to find the smaller ratio among the two ratios. The smaller ratio is set as the expanding/contracting ratio for generation of multi-picture image data.

After the expanding/contracting ratio is set, a calculation is executed to correct the width of the margins in the direction of providing the larger ratio because there will be otherwise left blank spaces having a larger width that the necessary minimum width YY or YT. For example, in the case of KY ) KT, the width of the actual right and left vertical margins is equal to the necessary minimum width YY, but the width YT' of the actual horizontal margins is larger than the necessary minimum width YT as shown in the following equation (7).

The following equations (5) and (6) can be expressed from the equations (1) and (3).

$$2YT'=PT-n\cdot KT\cdot IT-S\cdot(n-1) \quad (5)$$

$$2YT'=PT-n\cdot KY\cdot IT-S\cdot(n-1) \quad (6)$$

thus, $$YT'=YT+n\cdot IT\cdot(KT-KY)/2 \quad (7)$$

In the case of KT>KY, conversely, the width of the actual upper and lower horizontal margins is equal to the necessary minimum width YT, but the width YY' of the actual right and left vertical margin is larger than the necessary minimum width YY as shown in the following equation (8).

$$YY'=YY+m\cdot IT\cdot(KY-KT)/2 \quad (8)$$

Referring to FIG. 7, a first picture is read from the first storage portion of the image memory 32 by the image combining unit 34 (Step #21), and expanded or contracted at the set ratio (Step #22). Subsequently, an arrangement position for the expanded or contracted first picture is calculated based on the horizontal and vertical margin widths YT' and YY' and the gap S (Step #23), and the data of the expanded or contracted first picture image data is stored at the area of the second storage portion of the image memory 32 which corresponds to the calculated position (Step #24).

The operations of Steps #21 to #24 are repeatedly executed for the subsequent pictures. After all the pictures stored in the first storage portion of the image memory 32 is completed (YES in Step #24), this subroutine returns to Step #6 of the main routine.

Figure 8:
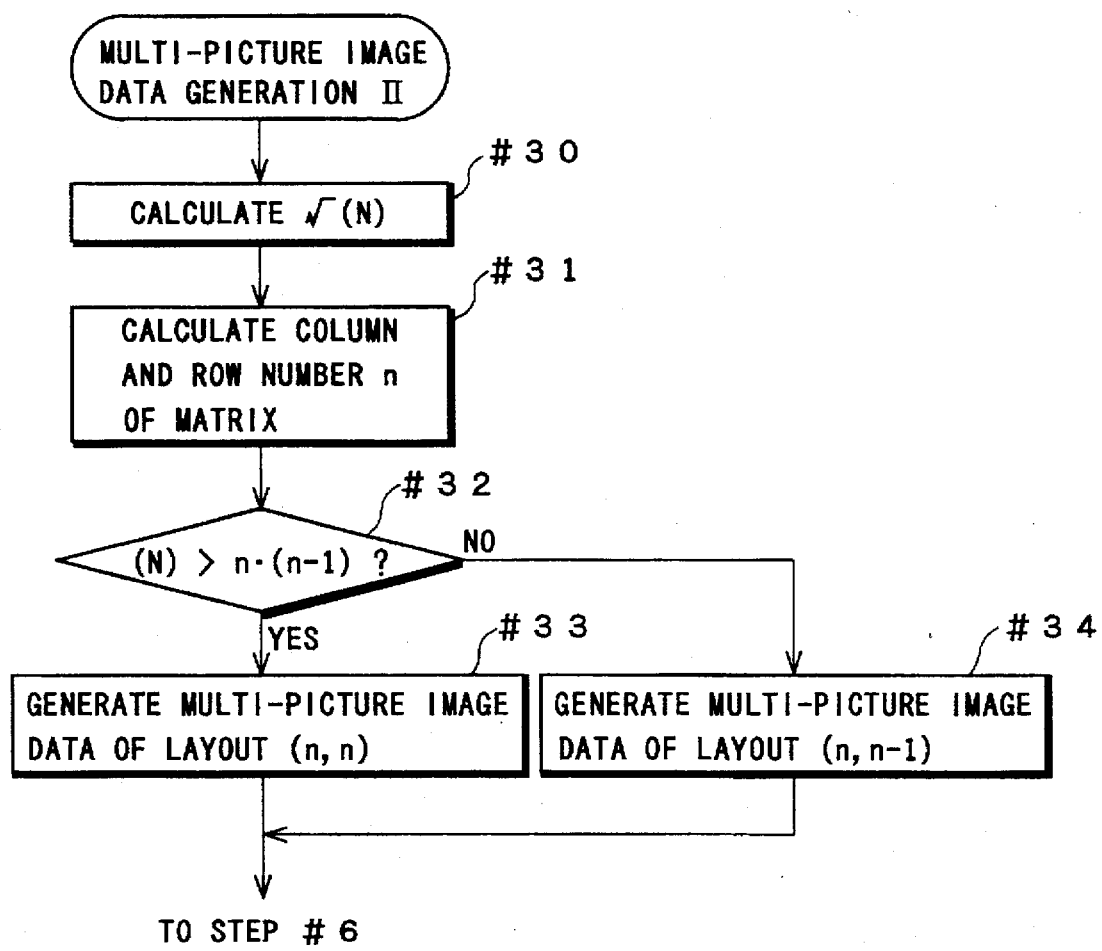
FIG. 8 is a flow chart showing a second "Multi-Picture Image Data Generation" subroutine of the image processing routine.

FIG. 8 is a flow chart showing a second "Multi-Picture Image Data Generation" subroutine of the image processing routine shown in FIG. 4.

In the first subroutine, since the layout pattern for the pictures is the square matrix (n, n), the difference ($n^2-N$) between the possible number $n^2$ of pictures to be arranged and the frame number N may become greater as the frame number N becomes greater. This leads to a greater blank space. For example, if N=28, the layout pattern of (6, 6) matrix is set. No pictures are visualized from the fourth position of the fifth row to the last position of the sixth row, thereby producing a blank space for eight pictures. In this case, since no picture is visualized in the sixth row, the six row is equivalent to the blank space and therefore a lower blank space in the single frame becomes greater.

In the second subroutine, even if $(n-1)^2<N<n^2$, the pictures are arranged in a longitudinally long matrix (n, n−1) when N<n·(n−1). This results in a reduced blank space unnecessarily produced at the bottom of the single frame. For example, when the frame number N is 28, 25(5× 5)<N(=28)<36 (=6×6), but 25<N<6×5=30. Thus, the pictures are visualized in the layout pattern of (6, 5) matrix. In this layout pattern, a blank space for only two pictures is produced in the sixth row and the pictures are arranged in a more balanced fashion than in the first subroutine.

When the subroutine shown in FIG. 8 is called in Step #5 of FIG. 4, a square root of the frame number $\sqrt{N}$ is calculated (Step #30). Similar to the first subroutine, the number n of columns or rows of the matrix (n, n) is calculated based on $\sqrt{N}$ (Step #31). It is then judged in Step #32 whether the frame number (N) is greater than n·(n−1). If n·(n−1)<N, a multi-picture image data of the layout pattern (n, n) matrix is generated (Step #33). If N≦n·(n−1), a multi-picture image data of the layout pattern (n, n−1) matrix is generated (Step #34). In similar to the first subroutine, specifically, the visualization format corresponding to the calculated layout pattern of (n, n) or (n, n−1) matrix is set. When the number n is set, the system controller 5 calls a multi-picture image data generating procedure stored in the ROM 51 in correspondence with the visualization format of the number n and combines the character information and picture image data in accordance with this procedure to generate a multi-picture image data.

For example, if N=21, n=5 since $\sqrt{(21)}$=4.58. In addition, since 5×4=20<21. the layout pattern of pictures is set to (5, 5) matrix. On the other hand, if N=19, n=5 similarly to the case where N=21 since $\sqrt{(19)}$=4.35. However, since 19<5×4=20, the layout pattern of the pictures is set to (5, 4) matrix.

Subsequently, this subroutine returns to Step #6 of the routine of FIG. 4 where the generated multi-picture image data is visualized.

Figure 9:
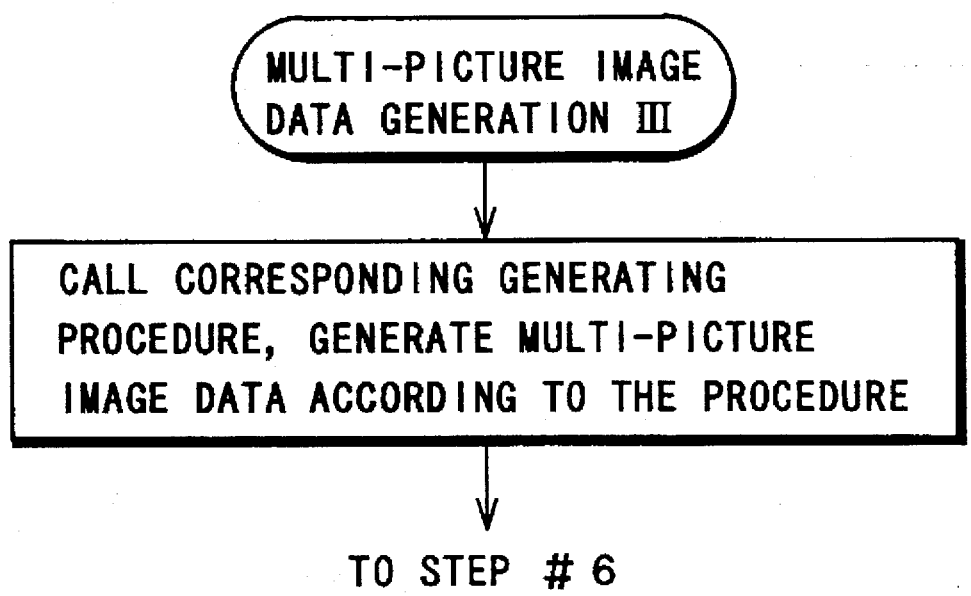
FIG. 9 is a flow chart showing a third "Multi-Picture Image Data Generation" subroutine of the image processing routine.
Figure 10:
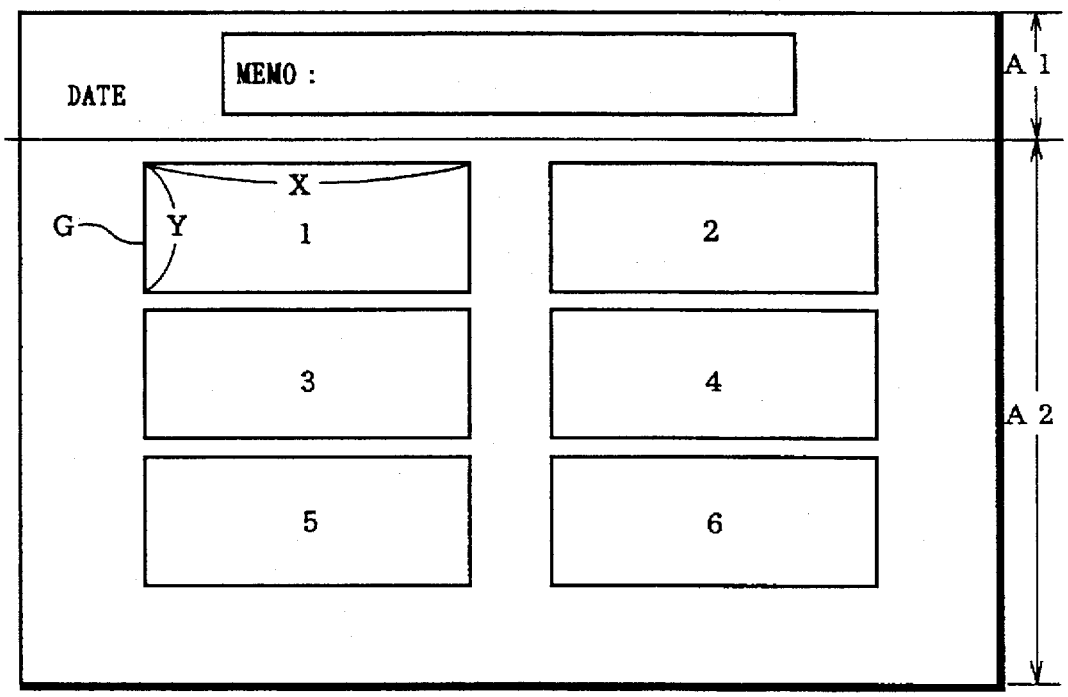
FIG. 10 is a diagram showing that six film pictures are reproduced in a single frame in a (3, 2) matrix layout pattern.
Figure 11:
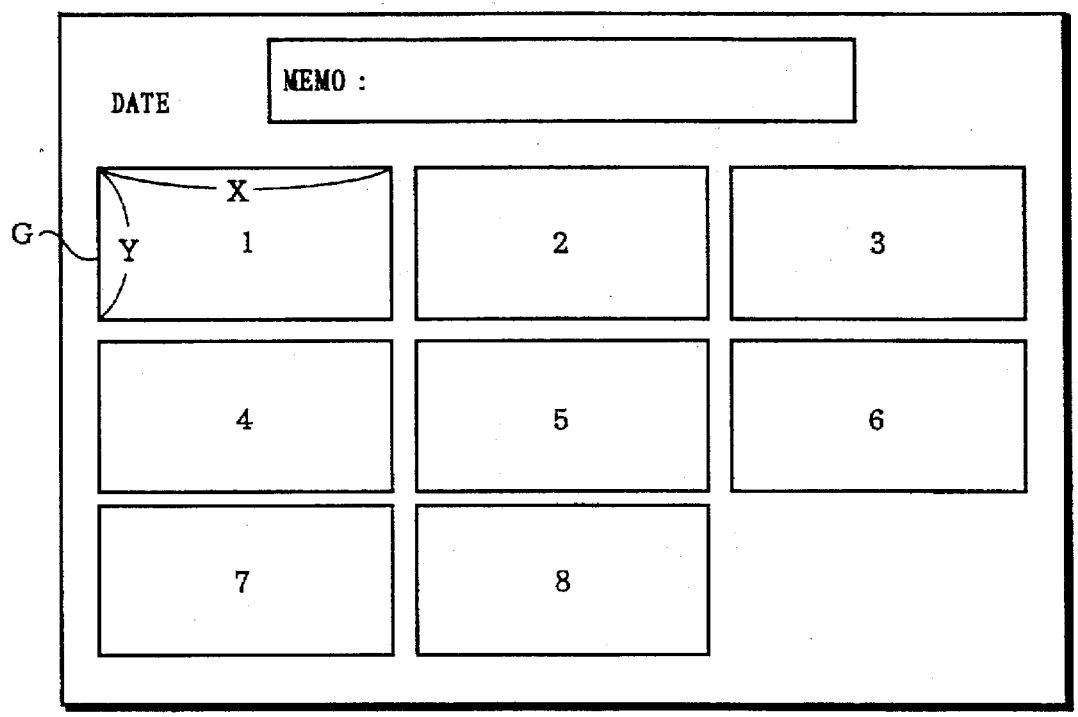
FIG. 11 is a diagram showing that eight film pictures are reproduced in a single frame in a (3, 3) matrix layout pattern.
Figure 12:
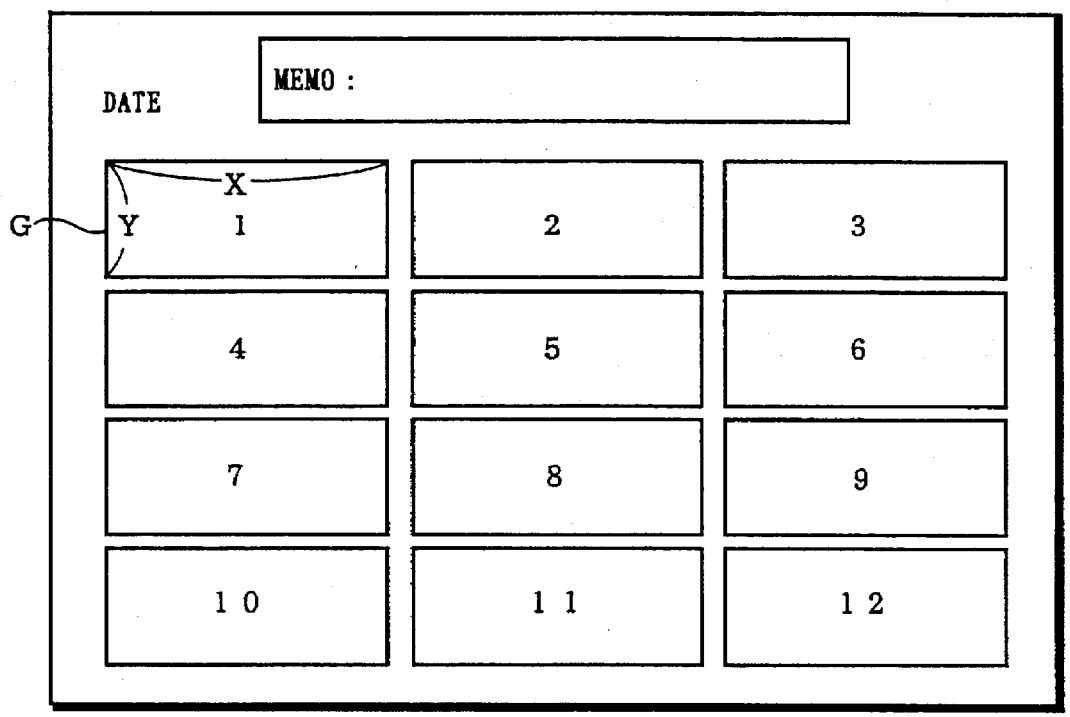
FIG. 12 is a diagram showing that twelve pictures are reproduced in a single frame in a (4, 3) matrix layout pattern.

FIG. 9 is a flow chart showing a third "Multi-Picture Image Data Generation" subroutine of the image processing routine.

In the third subroutine, multi-picture image data generating procedures corresponding to a variety of frame numbers N are preset and stored in the ROM 51 and a corresponding multi-picture image data generating procedure is directly called from the ROM 51 when the frame number N is read. The multi-picture image data is generated by executing this procedure.

In the third subroutine, the expanding/contracting ratio of the picture is preset corresponding to visualization formats. For example, in a case of presetting six formats, i.e., Format I to Format VI, it may be appreciated to allot Format I, Format II, Format III, Format IV, Format V, and Format VI with expanding/contracting ratios of 0.5. 0.7, 0.9, 1.1, 1.3, and 1.5, respectively.

A suitable visualization format is determined based on the number (N) of pictures and the corresponding expanding/contracting ratio is automatically set. The picture image data is read from the first storage portion of the image memory 32 and is then expanded or contracted in accordance with the set ratio. For example, in the above case, if Format II is determined, the pictures are contracted by the ratio of 0.7.

FIGS. 10 to 15 show examples in which a plurality of pictures are visualized on a horizontally long frame in a horizontally long and two-dimensional fashion, respectively. In these figures, 6, 8, 12, 20, 28, and 32 pictures are visualized in the single frame, respectively.

A plurality of pictures G are in (n, n) or (n, n−1) matrix in the picture area A2. The memo area A1 and the picture area A2 are set to have given dimensions, respectively. The size of the pictures G becomes smaller as the frame number increases.

The aspect ratio of the pictures G (Y:X) is not the same as that of the pictures (e.g., 4:3), but is set to such a value as to make the pictures relatively natural and easily seeable. In the examples shown in FIGS. 10 to 15, the pictures G are slightly longer in the horizontal direction than the pictures in connection with the picture area A2. When the aspect ratio of the pictures G (Y:X) differs from that of the pictures as shown in these figures, the data of the pictures G is generated by reading, from the image data stored in the image memory 32, the picture image data which fall within a region defined by this aspect ratio, and expanding or contracting the picture image data in accordance with the predetermined expanding or contracting ratio.

For example, when the pictures G are of horizontally long size, a region defined by the aspect ratio (Y:X) which is obtained by partially cutting off the image data of the picture in the vertical direction is extracted and the image data falling within the extracted region is read from the image memory 32 while expanding or contracting them in accordance with the predetermined ratio KT (or KY) to generate the multi-picture image data for the pictures G. In this case, the pictures G are partial images of the pictures; thus it is impossible to know the entire pictures from the visualized pictures G. However, provided that the visualized pictures are used as index information, it is permissible that the pictures G have only partial images of the pictures so long as they serve well as index information.

In this embodiment, the example is shown in which the pictures are edited and visualized in the layout pattern of (n, n) or (n, n−1) matrix. However, if the layout patter is set to (n−1, n) matrix in Step #34 of the second subroutine shown in FIG. 8, the pictures can be edited and visualized in the layout pattern of (n−1, n), too.

FIGS. 16 and 17 show examples in which the pictures are visualized in the layout pattern of (n−1, n). Specifically, FIG. 16 shows an example in which 40 pictures are visualized in a single frame in the layout pattern of (6, 7) matrix, whereas FIG. 17 shows an example in which 52 pictures are visualized in a single frame in the layout pattern of (7,8) matrix.

In the examples shown in FIGS. 10 to 17, the pictures are arranged in the order of (1, 1), (1, 2) . . . , (2, 1) . . . (2, 2) . . . (n, m). However, the order is not limited to the above. For instance, the pictures may be arranged in the order of (1, 1), (2, 1) . . . (1, 2), (2, 2) . . . (n, m). No blank area is produced in a picture area when the number of the pictures is equal to the number of the arranging positions. However, when the number of the pictures is smaller than that of the arranging positions, a blank area is produced in some arranging positions. This blank area differs depending upon how the pictures are arranged. In the examples shown in FIGS. 11, 14 to 16, the bank area is produced in the last row since the pictures are arranged in the order of (1, 1), (1, 2) . . . (n, m). However, when the pictures are arranged in the order of (1, 1), (2, 1) . . . (n, m), the blank area is produced in the column located most on the right.

Accordingly, when the number of the pictures is smaller than the number of the arranging positions, the arranging order of the pictures may be selected in consideration of whether the blank area is produced. In this case, the pictures may be arranged exactly in the order, or may be arranged while skipping some intermediate arranging positions as shown in FIG. 17, so that a blank area is produced in the intermediate arranging positions. In the example shown in FIG. 17, the 39th and subsequent pictures are arranged in the seventh row, thereby leaving the arranging positions (6, 7), (6, 8) blank. This enables a square blank area to be formed at a right bottom corner.

In the case where the number of the pictures is smaller than the number of the arranging positions, it is appropriate to make available a plurality of visualization formats having different arranging orders and to select a suitable visualization format by means of the input unit 6. With this arrangement, the blank area can be set suitably in a well-balanced manner in connection with the frame number N and the layout pattern.

As shown in FIGS. 16 and 17, when the frame number N is too large, the pictures G may become too small, resulting in reduced utility as index information. In such a case, for example, the pictures may be visualized on two frames 8 in a divided manner as shown in FIGS. 18A and 18B.

It will be appropriate to select the number of the multi-picture image frames on which the pictures are visualized and to automatically set the visualization format corresponding to the number of the multi-picture image frames input by means of the input unit 6.

Although the horizontally long pictures are arranged in the horizontally long frames in the foregoing examples of layout pattern, vertically long pictures may be arranged and visualized. Further, horizontally or vertically long pictures may be arranged and visualized in a vertically long frame.

Figure 19:
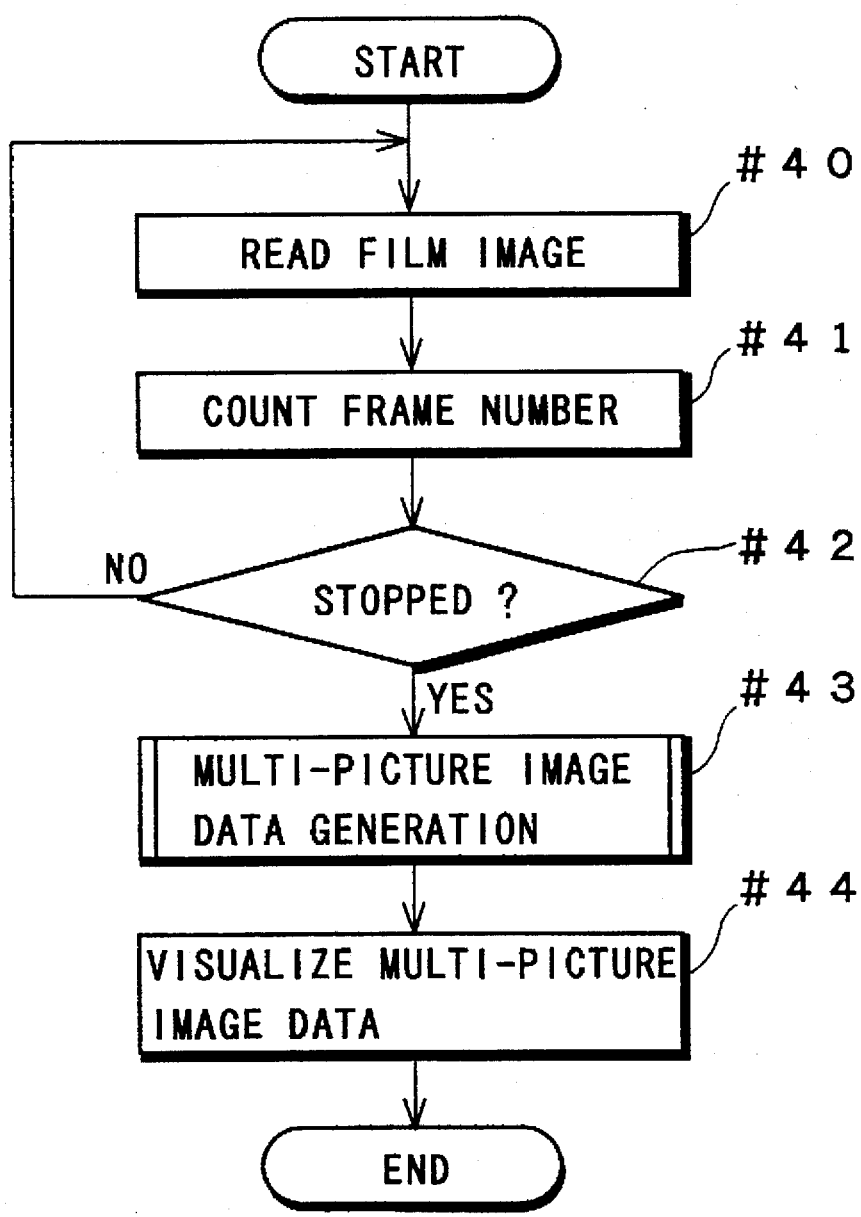
FIG. 19 is a flow chart showing another image processing operation of the first system.

FIG. 19 shows another image processing operation of the system shown in FIG. 1. Specifically, FIG. 19 is a flow chart showing an image processing operation when pictures recorded on strips of film (film strip) are read and visualized in a single frame.

When the pictures recorded on film strips are read, an operation is carried out which is basically similar to the One carried out when the pictures recorded on a roll film are read. In the case of the film strips, a frame number N' representing the number of frames contained in each film strip 7 is not recorded on the film 7 and the entire frame number N varies depending upon the number of the film strips 7. Accordingly, the frame number N cannot be automatically read from the film strips 7.

Accordingly, in the case of the film strips, the frame number N is counted up each time the picture is read from the film strip 7 (Step #41) and the frame number N to be visualized is determined when an operator stops the reading operation or by means of the input unit 6 (Step #42). In Step #43, a visualization format corresponding to the frame number N determined is set and a multi-picture image data is generated in accordance with this visualization format.

In the foregoing embodiment, a plurality of pictures recorded on the film 7 are read by the image reader 23 and the multi-picture image data is generated in accordance with the specified visualization format corresponding to the frame number and is visualized in the single frame. The multi-picture image data may be generated, for example, from a plurality of pictures generated by a computer or read by an image scanner, alternatively a plurality of still images obtained by a video camera or still camera, in accordance with the visualization format corresponding to the number of pictures and is visualized in the single frame.

Figure 20:
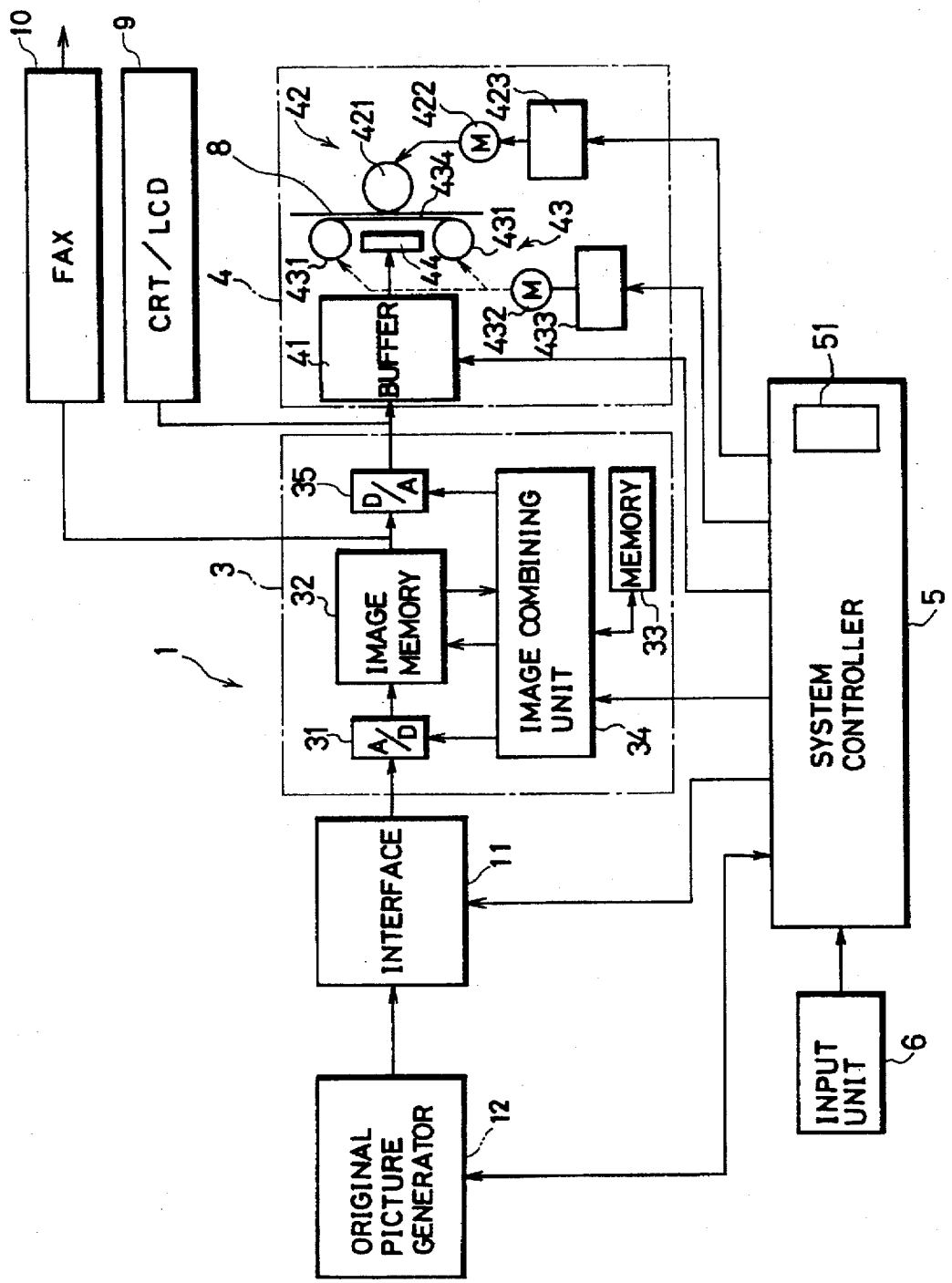
FIG. 20 is a schematic construction diagram showing a second image processing system according to the invention.

FIG. 20 is a schematic construction diagram showing a second image processing system according to the invention.

The second image processing system differs from the one shown in FIG. 1 in that an original picture generator 12 is connected to the image processor 3 by a way of an interface 11 in place of the film scanner 2. The original picture generator 12 is a computerized image generator, an image reading device such as image scanner, a photographing device such as still video camera, an image data reader for reading image data from image data storage medium such as CD-ROM disc, or the like device.

In the second embodiment, graphs, figures and like images generated by the original picture generator 12, a plurality of pictures read by the image scanner, or a plurality of still photographic pictures obtained by the still video camera are combined in a predetermined arrangement in a single frame, and the combined image is visualized, e.g., on the printing sheet or CRT/LCD display device. Since this embodiment is capable of editing a plurality of pictures collected from a variety of sources in a single frame, the visualized pictures can be used not only as index information, but also as, for example, reference material and presentation material.

Figure 21:
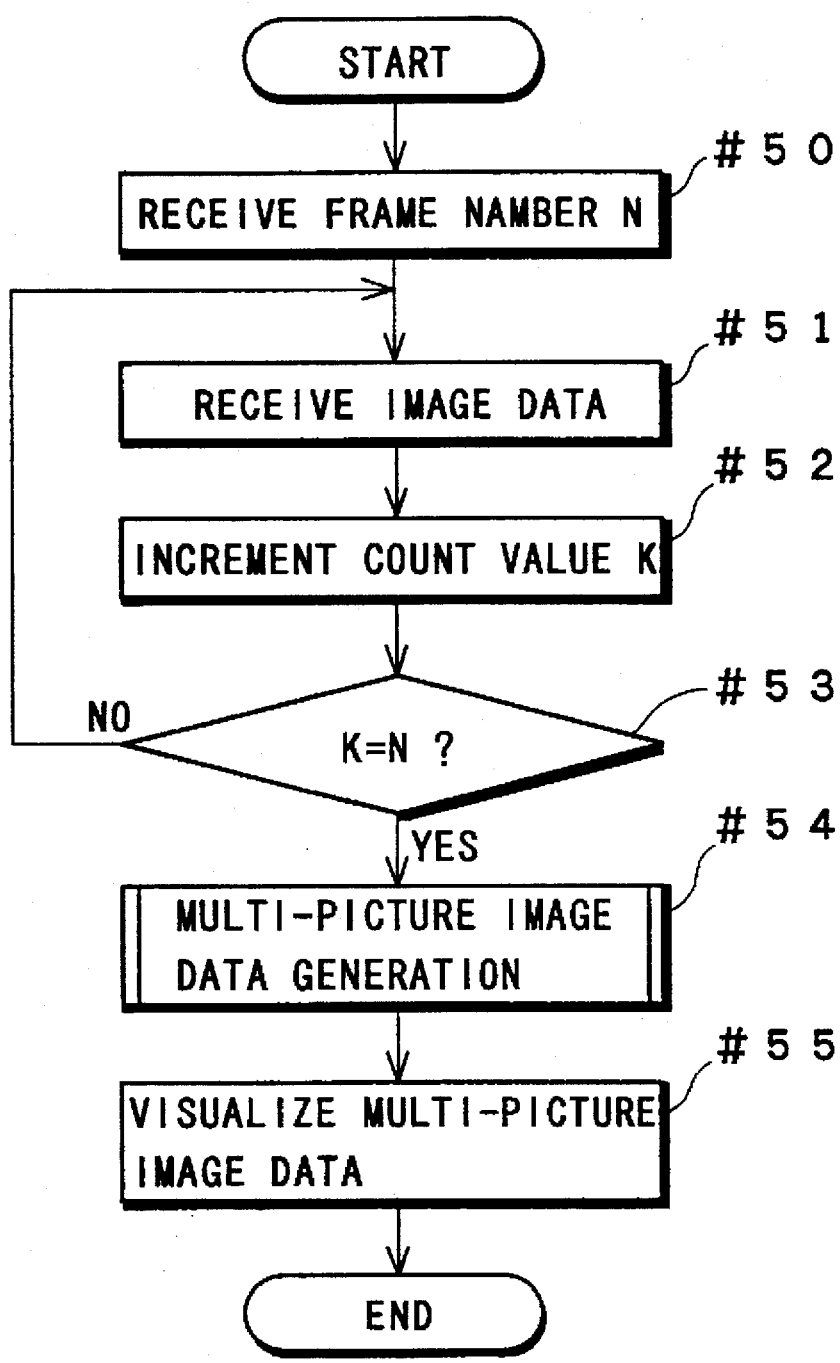
FIG. 21 is a flow chart showing an image processing operation routine of the second system.

FIG. 21 is a flow chart showing a principal operation of the second image processing system. The routine shown in FIG. 21 is basically the same as the one shown in FIG. 4. The routine shown in FIG. 4 is carried out to control the reading of the picture using the frame number N read from the film 7. The routine shown in FIG. 21 differs from the one shown in FIG. 4 in that the image processing system receives data representative of the frame number N transmitted from the original picture generator 12 and controls the reception of the image data transmitted from the original picture generator 12 on the basis of this frame number data.

The operations in Steps #54 and #55 are the same as those in Steps #5 and #6. Accordingly, description will here be given as to the operations in Steps #50 to #53.

First, the frame number data from the original picture generator 12 is received (Step #50). Subsequently, the picture image data are sequentially received from the original picture generator 12 (Steps #51 to #53). Specifically, the system controller 5 causes the frame number counter to increment the count value K each time receiving the picture image data (Step #52) and judges whether the count value K of the counter is equal to the frame number N (Step #53). The picture image data are received until the count value K becomes equal to the frame number N (a loop of Steps #51 to #53). When the count value K becomes equal to the frame number N, this routine proceeds to Step #54 in which a specified multi-picture image data is generated.

In Step #52, the frame number N may be initially set in the frame number counter and the received picture image data may be counted by decrementing the count value K upon each receipt of the picture image data.

Figure 22:
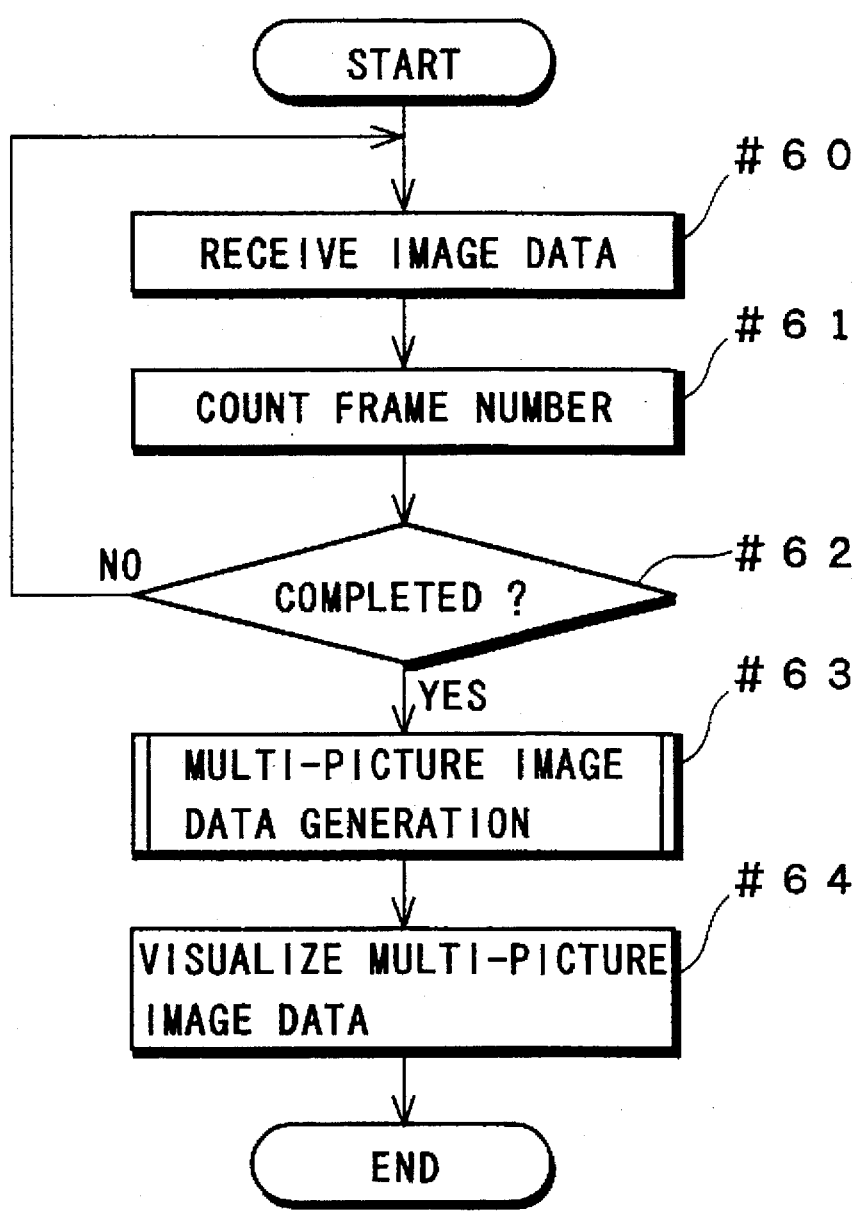
FIG. 22 is a flow chart showing another image processing operation routine of the second system.

FIG. 22 is a flow chart showing another principal operation of the second image processing system.

The routine shown in FIG. 21 is basically the same as the one shown in FIG. 19. In the routine shown in FIG. 19, the number of the pictures is counted upon each reading of the picture and the number of the pictures to be visualized is determined when the completion of the reading operation is designated by means of the input unit 6. The routine shown in FIG. 22 differs from the one shown in FIG. 19 in that the number of the picture image data is counted upon each receipt of the picture image data from the original picture generator 12 and the number of the pictures to be visualized is determined upon receipt of an image data completion signal.

The operations in Steps #63 and #64 are the same as those in Steps #43 and #44. Accordingly, description will be here given as to operations in Steps #60 to #62.

Upon receipt of the picture image data from the original picture generator 12 (Step #60), the frame number N is counted up (Step #61) and it is judged whether the image data completion signal has been received (Step #62). If no image data completion signal has been received (NO in Step #62), this routine returns to Step #60 and the next picture image data is received. Upon receipt of the completion signal (Yes in Step #62), it is judged that the picture image data to be visualized have been completely received and a multi-picture image data is generated in accordance with a visualization format corresponding to the number of the counted picture image data (Step #63). The thus generated multi-picture image data is visualized in the single frame (Step #64).

In the foregoing embodiments, the image processor 3 is described in the form of an unit separated from the picture scanner 2, original picture generator 12, printer 4, CRT/LCD display device 9, and facsimile machine 10 of the image processing system 1. However, it may be possible to incorporate the image processor 3 in these units.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image processing system comprising:
   an original picture generator operable to generate a plurality of pictures;
   a format determinator operable to determine a suitable visualization format for the plurality of pictures; and
   a multi-picture image generator operable to generate a multi-picture image in which the plurality of pictures are arranged in a single frame in accordance with the determined visualization format;
   wherein the format determinator includes:
   a detector operable to detect the number of the pictures; and
   a calculator which calculates a matrix of the visualization formats based on the number of the pictures.

2. An image processing system as defined in claim 1 wherein the calculator calculates a suitable matrix based on a square root of the number of the pictures.

3. An image processing system as defined in claim 1 further comprising a printer operable to print the multi-picture image on a printing sheet.

4. An image processing system as defined in claim 1 further comprising a cathode ray tube type display device to display the multi-picture image.

5. An image processing system as defined in claim 1 further comprising a facsimile machine to transmit the multi-picture image.

6. A method for generating a multi-picture image in which a plurality of pictures are arranged in a single frame, the method comprising:
   detecting the number of pictures stored on a recording medium;
   determining a suitable visualization format for the detected number;
   reading the pictures in accordance with the determined visualization format; and
   combining the read pictures to generate a multi-picture image;
   wherein the step of determining comprises calculating a matrix of the visualization formats based on the number of the pictures.

7. A method as defined in claim 6 further comprising printing the generated multipicture image on printing paper.

8. An image processing system comprising:
   an original picture generator operable to generate a plurality of pictures;
   a format determinator operable to determine a suitable visualization format for the plurality of pictures in accordance with the number of pictures, the visualization format and the number of pictures being uncorrelated prior to the determination; and
   a multi-picture image generator operable to generate a multi-picture image in which the plurality of pictures are arranged in a single frame in accordance with the determined visualization format;
   wherein the format determinator includes:
   a detector operable to detect the number of the pictures; and
   a calculator which calculates a matrix of the visualization formats based on the number of the pictures.

9. An image processing system as defined in claim 8 wherein the calculator calculates a suitable matrix based on a square root of the number of the pictures.

10. An image processing system as defined in claim 2 wherein the original picture generator includes an image reader operable to read the plurality of pictures recorded on a film.

11. An image processing system as defined in claim 10 wherein the image reader includes:
   a film feeder operable to feed the film:
   an image scanner operable to scan a picture located at a specified position;
   a controller operable to control the film feeder and the image scanner to feed a desired picture of the plurality of pictures to the specified position and scan the desired picture at the specified position.

12. An image processing system as defined in claim 11 wherein:
   the film is provided with a plurality of magnetic marks corresponding to the plurality of pictures respectively: and
   the format determinator includes a magnetic detector operable to read the magnetic marks to detect the number of the pictures.

13. An image processing system as defined in claim 11 wherein:
   the film is provided with a magnetic recording portion on which information on the number of the pictures is recorded; and
   the format determinator includes a magnetic detector operable to read the information recorded on the film to detect the number of the pictures.

14. An image processing system as defined in claim 13 wherein the format determinator detects the number of the pictures to determine a suitable format before the film scanner scans the pictures.

15. An image processing system as defined in claim 2 wherein the original picture generator includes an image reader operable to read the plurality of pictures.

16. An image processing system as defined in claim 2 further comprising a printer operable to print the multipicture image on a printing sheet.

17. An image processing system as defined in claim 2 further comprising a cathode ray tube type display device to display the multi-picture image.

18. An image processing system as defined in claim 2 further comprising a facsimile machine to transmit the multi-picture image.

19. A method for generating a multi-picture image in which a plurality of pictures are arranged in a single frame, the method comprising:
   detecting the number of pictures stored on a recording medium;
   determining a suitable visualization format for the detected number in accordance with the number of pictures, the visualization format and the number of pictures being uncorrelated prior to the determination;
   reading the pictures in accordance with the determined visualization format; and
   combining the read pictures to generate a multi-picture image:
   wherein the step of determining comprises calculating a matrix of the visualization formats based on the number of the pictures.

20. A method as defined in claim 19 further comprising printing the generated multi-picture image on printing paper.

21. An image processing system comprising:
   an original picture generator operable to generate a plurality of pictures;
   a format determinator operable to determine a suitable visualization format for the plurality of pictures;
   a multi-picture image generator operable to generate a multi-picture image in which the plurality of pictures are arranged in a single frame in accordance with the determined visualization format; and
   wherein the format determinator determines a visualization format in the form of a matrix, and includes:
   a detector operable to detect the number of the pictures;
   a calculator operable to calculate a square root of the detected number; and
   a matrix determinator operable to determine, based on the calculated square root, the number of columns and lines of a matrix suitable for the plurality of pictures.

* * * * *